US008531167B2

(12) United States Patent
Yamaguchi et al.

(10) Patent No.: US 8,531,167 B2
(45) Date of Patent: *Sep. 10, 2013

(54) CIRCUIT

(75) Inventors: Daisuke Yamaguchi, Kamakura (JP); Yuki Kamata, Fujisawa (JP); Eiji Hori, Yokohama (JP); Katsuyuki Omi, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,824

(22) Filed: Jan. 5, 2012

(65) Prior Publication Data

US 2012/0098515 A1 Apr. 26, 2012

Related U.S. Application Data

(62) Division of application No. 12/721,754, filed on Mar. 11, 2010, now Pat. No. 8,115,467.

(30) Foreign Application Priority Data

May 27, 2009 (JP) ................................. 2009-127990

(51) Int. Cl.
G05F 1/575 (2006.01)
G05F 1/618 (2006.01)

(52) U.S. Cl.
USPC .......................................... 323/285; 323/284

(58) Field of Classification Search
USPC .................. 323/225, 282, 283, 284, 285, 351
See application file for complete search history.

(56) References Cited

U.S. PATENT DOCUMENTS

| 5,490,055 | A | 2/1996 | Boylan et al. | |
|---|---|---|---|---|
| 6,424,132 | B1 * | 7/2002 | Wrathall | 323/282 |
| 7,489,119 | B2 | 2/2009 | Smith, Jr. et al. | |
| 7,649,345 | B2 | 1/2010 | Kwan | |
| 7,733,074 | B2 | 6/2010 | Hasegawa et al. | |
| 7,876,080 | B2 * | 1/2011 | Dwarakanath et al. | 323/284 |
| 7,990,116 | B2 * | 8/2011 | Solie et al. | 323/222 |
| 8,040,122 | B2 * | 10/2011 | Chang et al. | 323/288 |
| RE42,897 | E * | 11/2011 | Hawkes et al. | 323/282 |
| 8,115,467 | B2 * | 2/2012 | Yamaguchi et al. | 323/285 |

FOREIGN PATENT DOCUMENTS

JP 2005-045942 2/2005

* cited by examiner

*Primary Examiner* — Gary L Laxton
(74) *Attorney, Agent, or Firm* — White & Case LLP

(57) ABSTRACT

A DC-DC converter has an error amplifier that amplifies a potential difference between a first voltage based on an output voltage at the output terminal and a reference voltage, and outputs a resultant error amplified signal; a differential detecting circuit that senses an inclination of a temporal change of the output voltage by differentiating the first voltage, outputs a control signal according to a result of the sensing; and a PWM generating circuit that compares a synthetic signal obtained by conducting computation on the amplified error signal and the control signal with a periodically changing comparison signal, and outputs a PWM signal having a duty ratio controlled according to a result of the comparison.

20 Claims, 9 Drawing Sheets

CIRCUIT

CROSS REFERENCE TO RELATED APPLICATIONS

This application is a Division of application Ser. No. 12/721,754 filed Mar. 11, 2010, the entire contents of which is hereby incorporated by reference.

This application is based upon and claims the benefit of priority from the prior Japanese Patent Application No. 2009-127990, filed on May 27, 2009, the entire contents of which are incorporated herein by reference.

BACKGROUND OF THE INVENTION

1. Field of the Invention

The present invention relates to a CMOS bias circuit including a start circuit.

2. Background Art

In the conventional DC-DC converter such as a switching regulator, a configuration which monitors the output voltage, generates an amplified error signal by amplifying a difference between the output voltage and a desired target voltage in an error amplifier, and exercises feedback control on the output voltage in accordance with the amplified error signal.

Since a delay is generated by an inductor and a capacitor in such a DC-DC converter, it is difficult to bring its control band into high frequencies when it is seen as a power supply.

Response characteristics obtained when an abrupt load variation has occurred depend on the control band. For reducing the output voltage variation, therefore, it is necessary to bring the control band into high frequencies.

Some conventional DC-DC converter operates so as to bring the output voltage close to the target voltage, and brings the temporal change rate of the output voltage close to zero provided that the output voltage is within a voltage range containing the target voltage (see, for example, JP-A-2005-45942 (KOKAI)).

SUMMARY OF THE INVENTION

According to one aspect of the present invention, there is provided: a DC-DC converter supplying a target voltage to an external load connected to an output terminal, the DC-DC converter comprising:

a first switch element connected at a first end thereof to a power supply;

a second switch element connected between a second end of the first switch element and ground;

an inductor connected at a first end thereof to a node between the first switch element and the second switch element and connected at a second end thereof to an output terminal;

a capacitor connected between the output terminal and the ground;

an error amplifier that amplifies a potential difference between a first voltage based on an output voltage at the output terminal and a reference voltage, and outputs a resultant error amplified signal;

a differential detecting circuit that senses an inclination of a temporal change of the output voltage by differentiating the first voltage, outputs a control signal according to a result of the sensing, outputs a first boost signal as the control signal if the inclination exceeds a predetermined positive first threshold, outputs a second boost signal as the control signal if the inclination is less than a predetermined negative second threshold, and outputs a reference signal as the control signal in other cases; and a PWM generating circuit that compares a synthetic signal obtained by conducting computation on the amplified error signal and the control signal with a periodically changing comparison signal, and outputs a PWM signal having a duty ratio controlled according to a result of the comparison, wherein the first switch element and the second switch element are changed over in an on/off state in a complementary manner according to the PWM signal, if the first boost signal is contained in the synthetic signal, the PWM generating circuit controls the duty ratio in order to increase a ratio of the on-state of the second switch element, and if the second boost signal is contained in the synthetic signal, the PWM generating circuit controls the duty ratio in order to increase a ratio of the on-state of the first switch element.

According to another aspect of the present invention, there is provided: a DC-DC converter supplying a target voltage to an external load connected to an output terminal, the DC-DC converter comprising:

a first switch element connected at a first end thereof to a power supply;

a second switch element connected between a second end of the first switch element and ground;

an inductor connected at a first end thereof to a node between the first switch element and the second switch element and connected at a second end thereof to an output terminal;

a capacitor connected between the output terminal and the ground;

a voltage divider circuit that outputs a first voltage obtained by conducting voltage division on the output voltage;

an error amplifier that amplifies a potential difference between the first voltage and a reference voltage, and outputs a resultant error amplified signal;

a differential detecting circuit that senses an inclination of a temporal change of the output voltage by differentiating the first voltage, outputs a control signal according to a result of the sensing, outputs a first boost signal as the control signal if the inclination exceeds a predetermined positive first threshold, outputs a second boost signal as the control signal if the inclination is less than a predetermined negative second threshold, and outputs a reference signal as the control signal in other cases; and a PWM generating circuit that compares a synthetic signal obtained by conducting computation on the amplified error signal and the control signal with a periodically changing comparison signal, and outputs a PWM signal having a duty ratio controlled according to a result of the comparison, wherein the first switch element and the second switch element are changed over in an on/off state in a complementary manner according to the PWM signal, if the first boost signal is contained in the synthetic signal, the PWM generating circuit controls the duty ratio in order to increase a ratio of the on-state of the second switch element, and if the second boost signal is contained in the synthetic signal, the PWM generating circuit controls the duty ratio in order to increase a ratio of the on-state of the first switch element.

According to still another aspect of the present invention, there is provided: a DC-DC converter supplying a target voltage to an external load connected to an output terminal, the DC-DC converter comprising:

a first switch element connected at a first end thereof to a power supply;

a second switch element connected between a second end of the first switch element and ground;

an inductor connected at a first end thereof to a node between the first switch element and the second switch element and connected at a second end thereof to an output terminal;

a capacitor connected between the output terminal and the ground;

an analog-to-digital converter that outputs a first signal obtained by conducting analog-to-digital conversion on the first voltage based on the output voltage at the output terminal;

a differential detecting circuit that senses an inclination of a temporal change of the output voltage by differentiating the first voltage based on the first signal, outputs a control signal according to a result of the sensing, outputs a first boost signal as the control signal if the inclination exceeds a predetermined positive first threshold, outputs a second boost signal as the control signal if the inclination is less than a predetermined negative second threshold, and outputs a reference signal as the control signal in other cases; and a duty computer circuit that compares a synthetic signal obtained by conducting computation on an amplified error signal which is a digital signal obtained by amplifying a potential difference between the first voltage and a reference voltage with a periodically changing comparison signal, and outputs a PWM signal having a duty ratio controlled according to a result of the comparison, wherein the first switch element and the second switch element are changed over in an on/off state in a complementary manner according to the PWM signal, if the first boost signal is contained in the synthetic signal, the duty computer circuit controls the duty ratio in order to increase a ratio of the on-state of the second switch element, and if the second boost signal is contained in the synthetic signal, the duty computer circuit controls the duty ratio in order to increase a ratio of the on-state of the first switch element.

DETAILED DESCRIPTION

Comparative Example

As a comparative example, a DC-DC converter which is a switching regulator of voltage mode will now be described.

Figure 1:
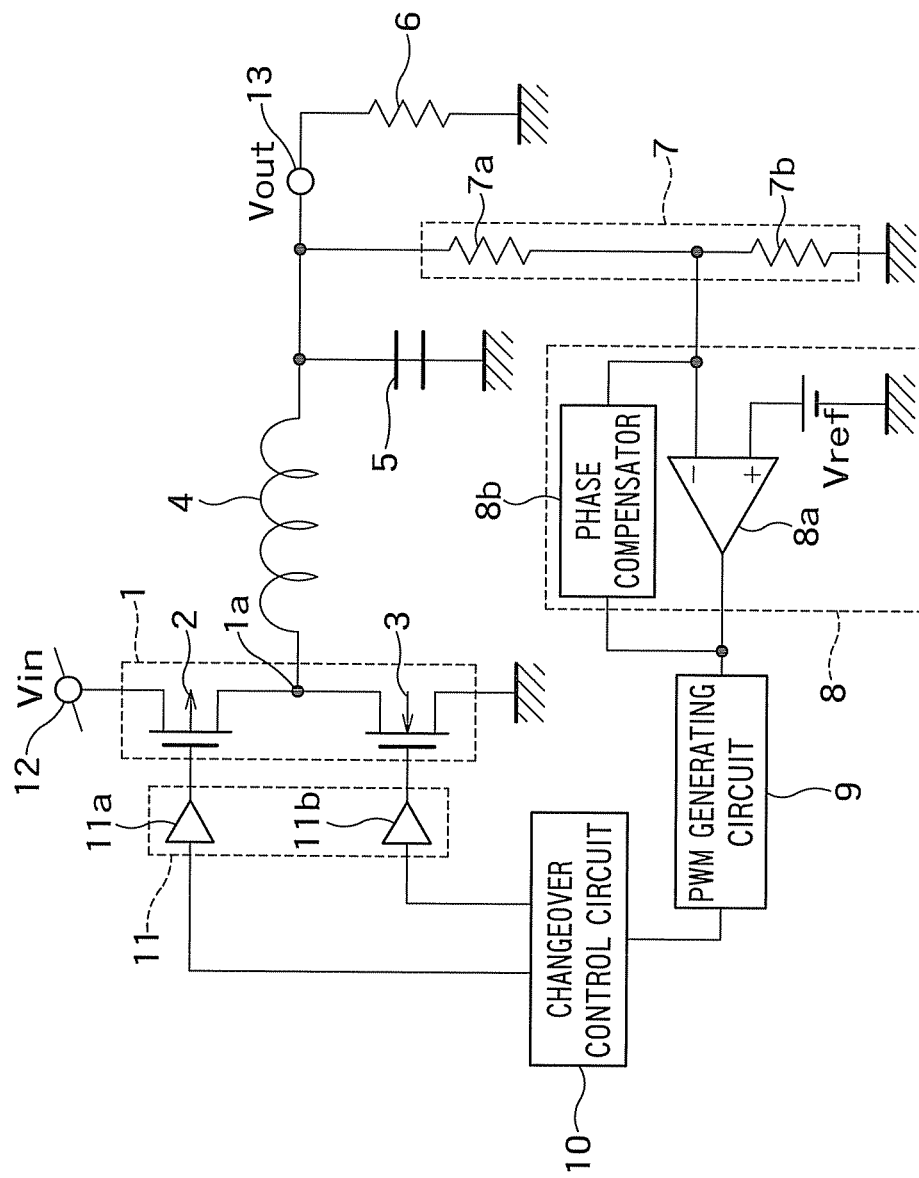
FIG. 1 is a diagram showing an example of a configuration of a DC-DC converter 100a which is a comparative example.

FIG. 1 is a diagram showing an example of a configuration of a DC-DC converter 100a which is a comparative example.

As shown in FIG. 1, the DC-DC converter 100a includes a switch circuit 1, an inductor 4, a capacitor 5, a voltage divider circuit 7, an error amplifier 8, a PWM generating circuit 9, a changeover control circuit 10, a gate driver circuit 11, and an output terminal 13.

In the DC-DC converter 100a, the error amplifier 8 amplifies a difference between an output voltage Vout and a target voltage and generates an amplified error signal, and the PWM generating circuit 9 generates a PWM signal from the amplified error signal. The changeover control circuit 10 activates first switch element 2 and second switch element 3 in the switch circuit 1 in a complementary manner via the gate driver circuit 11 in accordance with the PWM signal. The changeover control circuit 10 exercises control so as to prevent the first switch element 2 and the second switch element 3 from turning on simultaneously in order to suppress the through current of the switch circuit 1. The gate driver 11 including buffers 11a and 11b is adapted to drive the switch circuit 1 fast and suitably.

For example, if a change has occurred in a load current Tout, then the DC-DC converter 100a in the comparative example changes a voltage (output voltage Vout) across the capacitor 5, changes a duty ratio of the PWM signal according to the change quantity of the output voltage Vout, and changes the ratio of the changeover ratio of the first and second switch elements 2 and 3. As a result, the output voltage Vout is controlled so as to get near the target voltage.

The switch circuit 1 outputs an input voltage (power supply voltage) Vin and a ground voltage alternately according to the PWM signal, and this output is applied to a first end of the inductor 4. Then, a voltage of the output voltage Vout is generated at a second end of the inductor. Therefore, a difference voltage between a voltage output by the switch circuit 1 and the output voltage Vout is applied across the inductor 4.

Not considering the loss of the switch circuit 1 and taking a terminal on the output voltage Vout side of the inductor 4, a potential difference generated across the inductor 4 becomes a voltage equal to an input voltage Vin–the output voltage Vout, i.e., a positive voltage, when the first switch element 2 is on. On the other hand, when the second switch element 3 is on, the potential difference generated across the inductor 4 becomes a voltage equal to the ground voltage—the output voltage Vout, i.e., a negative voltage.

Therefore, a voltage applied to the inductor 4 becomes repeated alternation of the positive voltage and the negative voltage. The voltage applied to the inductor 4 takes a pulse shape, and the current flowing through the inductor 4 takes a triangular wave.

If the current flowing through the inductor 4 balances a current flowing through a load 6, then a current flowing through the capacitor 5 equivalently becomes "0" and the output voltage Vout is in the stable state.

As for the setting of the output voltage Vout, the output voltage Vout is set by a reference voltage Vref and a voltage division ratio of the voltage divider circuit 7.

Figure 2:
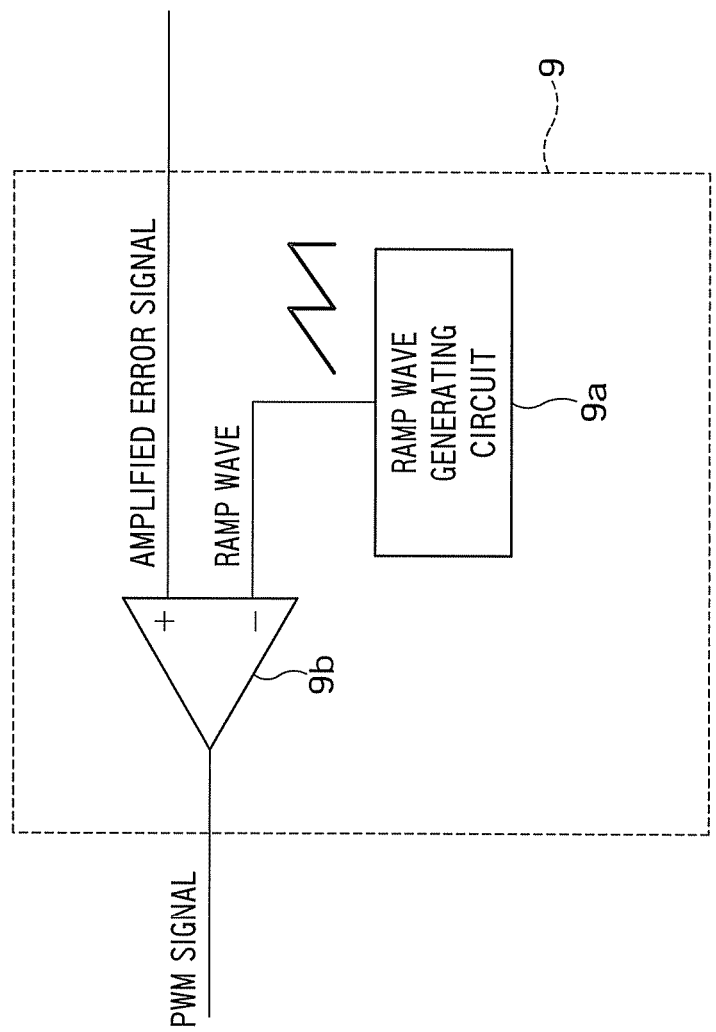
FIG. 2 is a diagram showing an example of the PWM generating circuit 9 in the DC-DC converter 100a shown in FIG. 1.

FIG. 2 is a diagram showing an example of the PWM generating circuit 9 in the DC-DC converter 100*a* shown in FIG. 1.

As shown in FIG. 2, the PWM generating circuit 9 includes a ramp wave generating circuit 9*a* which generates a ramp wave, and an amplifier 9*b* which compares the ramp wave with the amplified error signal and outputs a PWM signal according to a result of the comparison.

Figure 3:
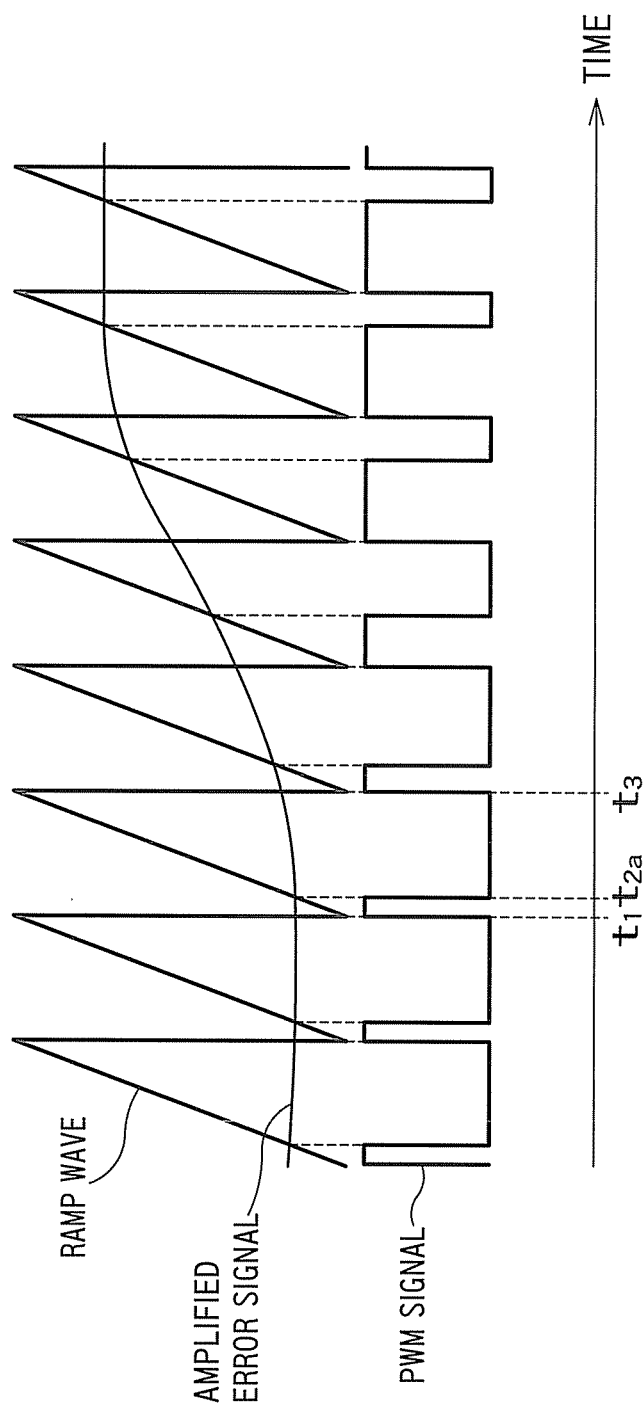
FIG. 3 is a waveform diagram showing an example of a signal waveform of the PWM generating circuit 9 shown in FIG. 2.
Figure 4:
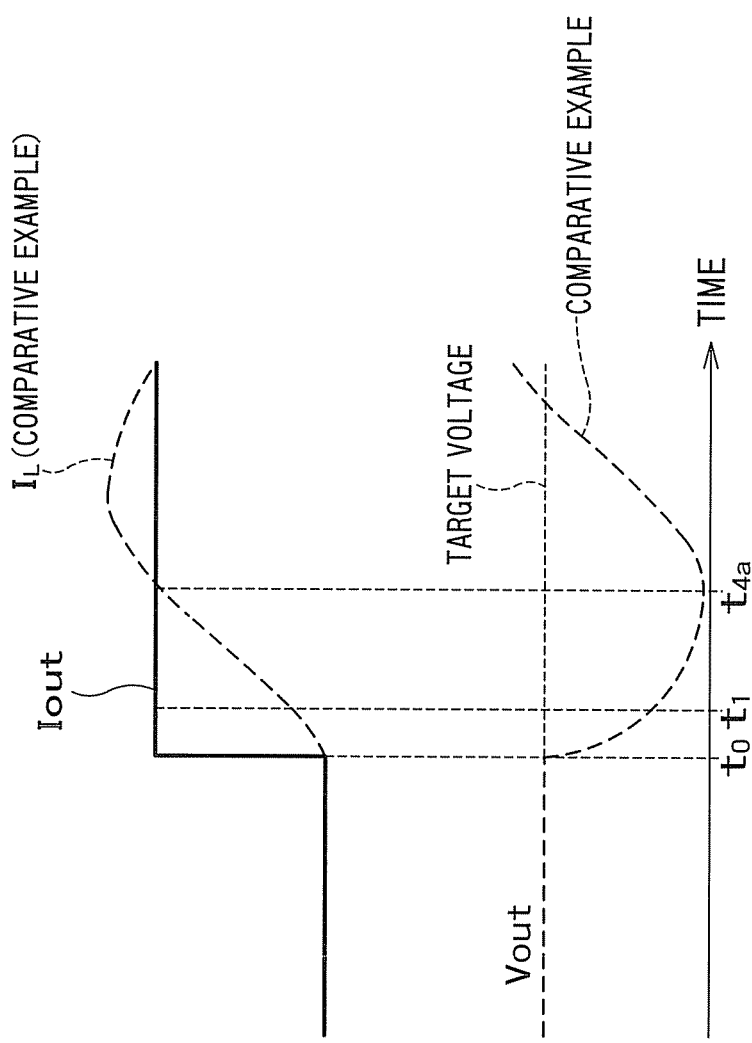
FIG. 4 is a waveform diagram showing an example of waveforms of an output current (load current) Iout, a capacitor current Ic, and an output voltage Vout obtained in the DC-DC converter 100a of the comparative example when the load has varied abruptly.

FIG. 3 is a waveform diagram showing an example of a signal waveform of the PWM generating circuit 9 shown in FIG. 2. FIG. 4 is a waveform diagram showing an example of waveforms of an output current (load current) Iout, a capacitor current Ic, and an output voltage Vout obtained in the DC-DC converter 100*a* of the comparative example when the load has varied abruptly.

As shown in FIG. 3, the PWM generating circuit 9 outputs a PWM signal which varies in duty ratio according to the comparison result of the ramp wave and the amplified error signal.

For example, over a time period between time t1 and time t2*a*, the amplitude of the amplified error signal is larger than the amplitude of the ramp wave, and consequently the PWM signal assumes the "high" level. On the other hand, over a time period between the time t2*a* and time t3, the amplitude of the amplified error signal is smaller than the amplitude of the ramp wave, and consequently the PWM signal assumes the "low" level.

For example, when the PWM signal assumes the "high" level, the changeover control circuit 10 exercises control so as to turn on the first switch element 2 and turn off the second switch element 3. On the other hand, when the PWM signal assumes the "low" level, the changeover control circuit 10 exercises control so as to turn off the first switch element 2 and turn on the second switch element 3.

If the load current Iout abruptly increases at time t0, then the voltage across the capacitor 5 (the output voltage Vout) abruptly falls. Thereupon, the DC-DC converter 100*a* increases an inductor current IL flowing through the inductor 4 by the operation already described, and raises the output voltage Vout to the target voltage.

For example, in the vicinity of time t1 in the comparative example, the amplitude change of the amplified error signal is small and consequently the change of the duty ratio of the PWM signal is also small. Therefore, time t4*a* when the inductor current IL becomes equal to the load current Iout becomes late. As a result, falling of the output voltage Vout also becomes large.

Also in the case where the load current Iout abruptly decreases, the above-described tendency holds true except the polarity becomes opposite.

When there is an abrupt change in the load current Iout, the DC-DC converter 100*a* in the comparative example cannot output the output voltage Vout more stably, as heretofore described.

Hereafter, as regards the problem of the comparative example found by the present inventors, embodiments of a DC-DC converter according to the present invention will be described more specifically with reference to the drawings.

First Embodiment

Figure 5:
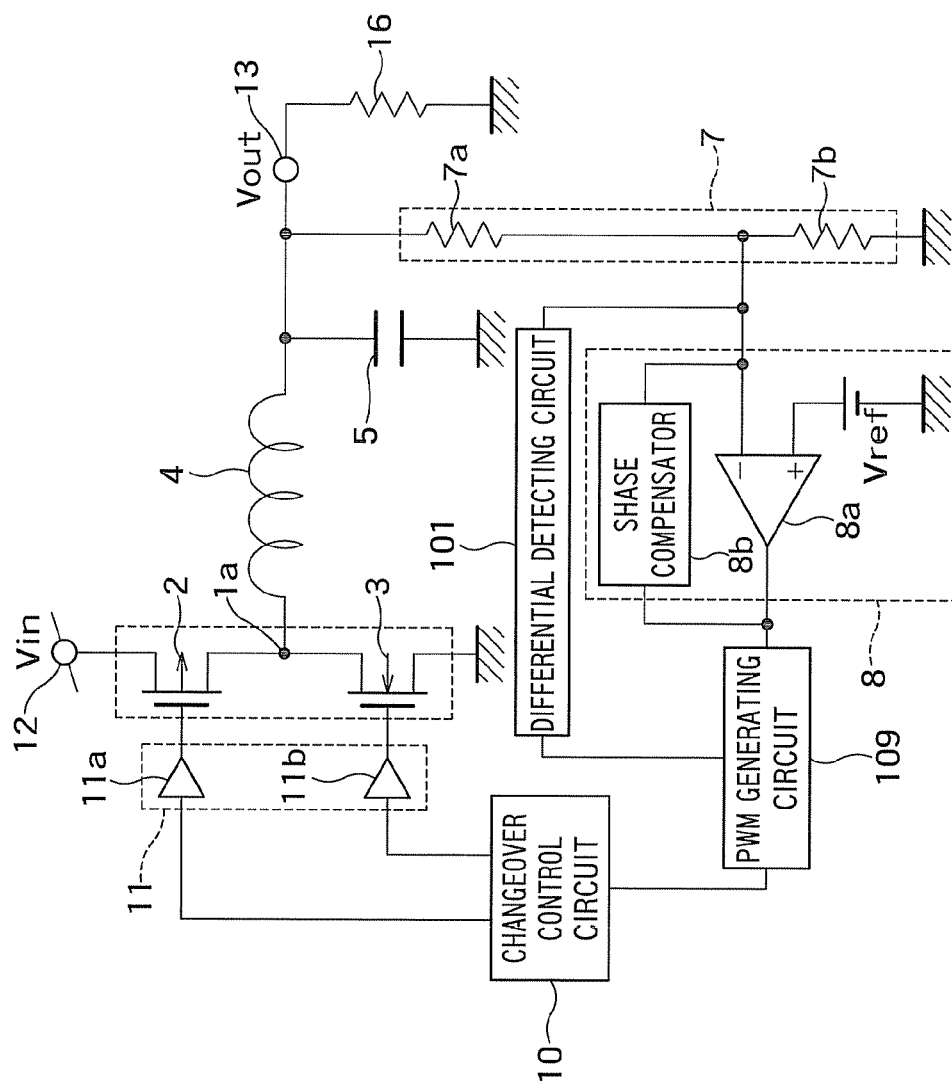
FIG. 5 is a diagram showing an example of a configuration of a DC-DC converter according to a first embodiment which is one aspect of the present invention.

FIG. 5 is a diagram showing an example of a configuration of a DC-DC converter according to a first embodiment which is one aspect of the present invention.

As shown in FIG. 5, a DC-DC converter 100 includes a switch circuit 1, an inductor 4, a capacitor 5, a voltage divider circuit 7, an error amplifier 8, a differential detecting circuit 101, a PWM generating circuit 109, a changeover control circuit 10, a gate driver circuit 11, and an output terminal 13.

The switch circuit 1 includes a first switch element 2 and a second switch element 3.

The first switch element 2 is, for example, a pMOS transistor, and a first end (source) thereof is connected to a power supply 12. The first switch element 2 may be a switch element such as another transistor element.

The second switch element 3 is, for example, an nMOS transistor, and connected between a second end (drain) of the first switch element 2 and the ground. The second switch element 3 may be a switch element such as another transistor element.

The inductor 4 is connected at its first end to a node 1a between the first switch element 2 and the second switch element 3, and connected at its second end to an output terminal 13.

The capacitor 5 is connected between the output terminal 13 and the ground.

The voltage divider circuit 7 outputs a first voltage obtained by conducting voltage division on the output voltage Vout. The voltage divider circuit 7 includes, for example, a resistor element 7*a* connected at its first end to the output terminal 13, and a resistor element 7*b* connected between a second end of the resistor element 7*a* and the ground. The first voltage is obtained from the output voltage Vout by voltage division using the resistor elements 7*a* and 7*b*.

The voltage divider circuit 7 may be omitted by inputting the output voltage Vout directly to the error amplifier circuit 8, as occasion demands. In this case, the first voltage becomes the output voltage Vout.

The error amplifier 8 outputs an amplified error signal by amplifying a potential difference between the first voltage based on the output voltage Vout at the output terminal 13 and a reference voltage Vref. When the first voltage is equal to the reference voltage Vref, the output voltage Vout becomes equal to the target voltage.

The error amplifier 8 includes, for example, an amplifier 8*a* which outputs an amplified error signal obtained by amplifying the potential difference between the first voltage and the reference voltage Vref, and a phase compensator 8*b* which compensates a phase of the amplified error signal.

The differential detecting circuit 101 senses an inclination of a temporal change of the output voltage Vout by differentiating the first voltage, and outputs a control signal according to a result of the sensing. The differential detecting circuit 101 is, for example, a high pass filter which detects the inclination.

In other words, if the inclination exceeds a predetermined positive first threshold, the differential detecting circuit 101 outputs a first boost signal as the control signal. If the inclination becomes less than a predetermined negative second threshold, the differential detecting circuit 101 outputs a second boost signal as the control signal. In other cases, the differential detecting circuit 101 outputs the reference signal as the control signal.

For example, the differential detecting circuit 101 may detect the inclination based on a time period required for the first voltage to change by a predetermined potential difference. The differential detecting circuit 101 may detect the inclination based on a potential difference by which the first voltage has changed during a predetermined time period.

In this way, the differential detecting circuit 101 monitors the output voltage Vout (i.e., the voltage across the capacitor 5), and detects an inclination of a temporal change of the output voltage Vout. The differential detecting circuit 101 outputs the control signal based on a relation between the inclination of the temporal change of the output voltage Vout and a predetermined threshold.

For example, the differential detecting circuit 101 outputs a first boost signal or a second boost signal which becomes large in amplitude if the absolute value of the inclination becomes large.

The differential detecting circuit 101 outputs the first boost signal or the second boost signal over, for example, only one period of the comparison signal (ramp wave), and then outputs a reference signal. The differential detecting circuit 101 may output the first boost signal or the second boost signal over one period of the comparison signal (ramp wave) and then attenuate the amplitude of the first boost signal or the second boost signal that is outputted.

The PWM generating circuit 109 compares a synthetic signal obtained by adding (computing) the amplified error signal and the control signal with a periodically changing comparison signal, and outputs a PWM signal having a duty ratio controlled according to a result of the comparison. The comparison signal is, for example, a ramp wave.

If the synthetic signal contains the first boost signal, the PWM generating circuit 109 controls the duty ratio so as to increase the ratio of the on-state of the second switch element 3. On the other hand, if the synthetic signal contains the second boost signal, the PWM generating circuit 109 controls the duty ratio so as to increase the ratio of the on-state of the first switch element 2.

For example, if the amplitude of the first boost signal becomes large, then the PWM generating circuit 109 controls the duty ratio so as to increase the ratio of the on-state of the second switch element 3. If the amplitude of the second boost signal becomes large, then the PWM generating circuit 109 controls the duty ratio so as to increase the ratio of the on-state of the first switch element 2.

The changeover control circuit 10 changes over on/off of the first switch element 2 and the second switch element 3 in a complementary manner via the gate driver circuit 11 in accordance with the PWM signal. As already described, the ratio of the complementary on/off state of the first switch element 2 and the second switch element 3 is set so as to vary depending on the duty ratio of the PWM signal.

The changeover control circuit 10 exercises control so as to prevent the first switch element 2 and the second switch element 3 from turning on simultaneously in order to suppress the through current in the switch circuit 1.

The gate driver 11 including buffers 11a and 11b is adapted to drive the switch circuit 1 fast and suitably.

Figure 6:
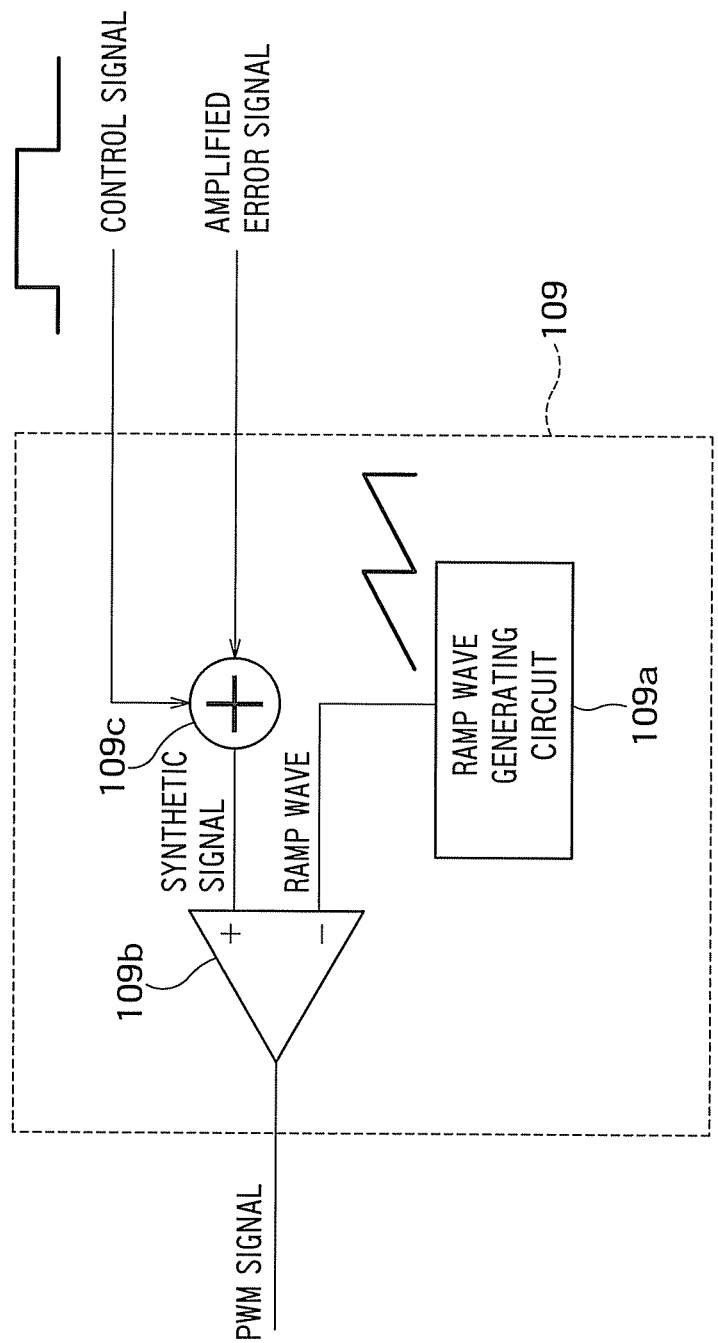
FIG. 6 is a diagram showing an example of a configuration of the PWM generating circuit 109 in the DC-DC converter 100 shown in FIG. 5.

FIG. 6 is a diagram showing an example of a configuration of the PWM generating circuit 109 in the DC-DC converter 100 shown in FIG. 5.

As shown in FIG. 6, the PWM generating circuit 109 includes a ramp wave generating circuit 109a, an amplifier 109b, and an adder 109c.

The ramp wave generating circuit 109a is adapted to generate a ramp wave as a comparison signal, and outputs the ramp wave.

The adder 109c is adapted to add (compute) the amplified error signal output by the error amplifier circuit 8 and the control signal output by the differential detecting circuit 101, and output a resultant synthetic signal.

The amplifier 109b is adapted to compare the synthetic signal with the ramp wave, generate a PWM signal having a duty ratio which varies depending on a result of the comparison, and output the PWM signal.

As heretofore described, the DC-DC converter 100 according to the first embodiment has a configuration obtained by adding the control loop which passes through the differential detecting circuit 101 to the DC-DC converter in the comparative example already described.

An example of operation of the DC-DC converter 100 having the configuration described heretofore will now be described. Hereafter, the case where the inclination of the temporal change of the output voltage Vout becomes less than the second threshold and the differential detecting circuit 101 outputs the second boost signal will be described. However, similar operation is also conducted in the case where the inclination of the temporal change of the output voltage Vout exceeds the first threshold and the differential detecting circuit 101 outputs the first boost signal.

Figure 7:
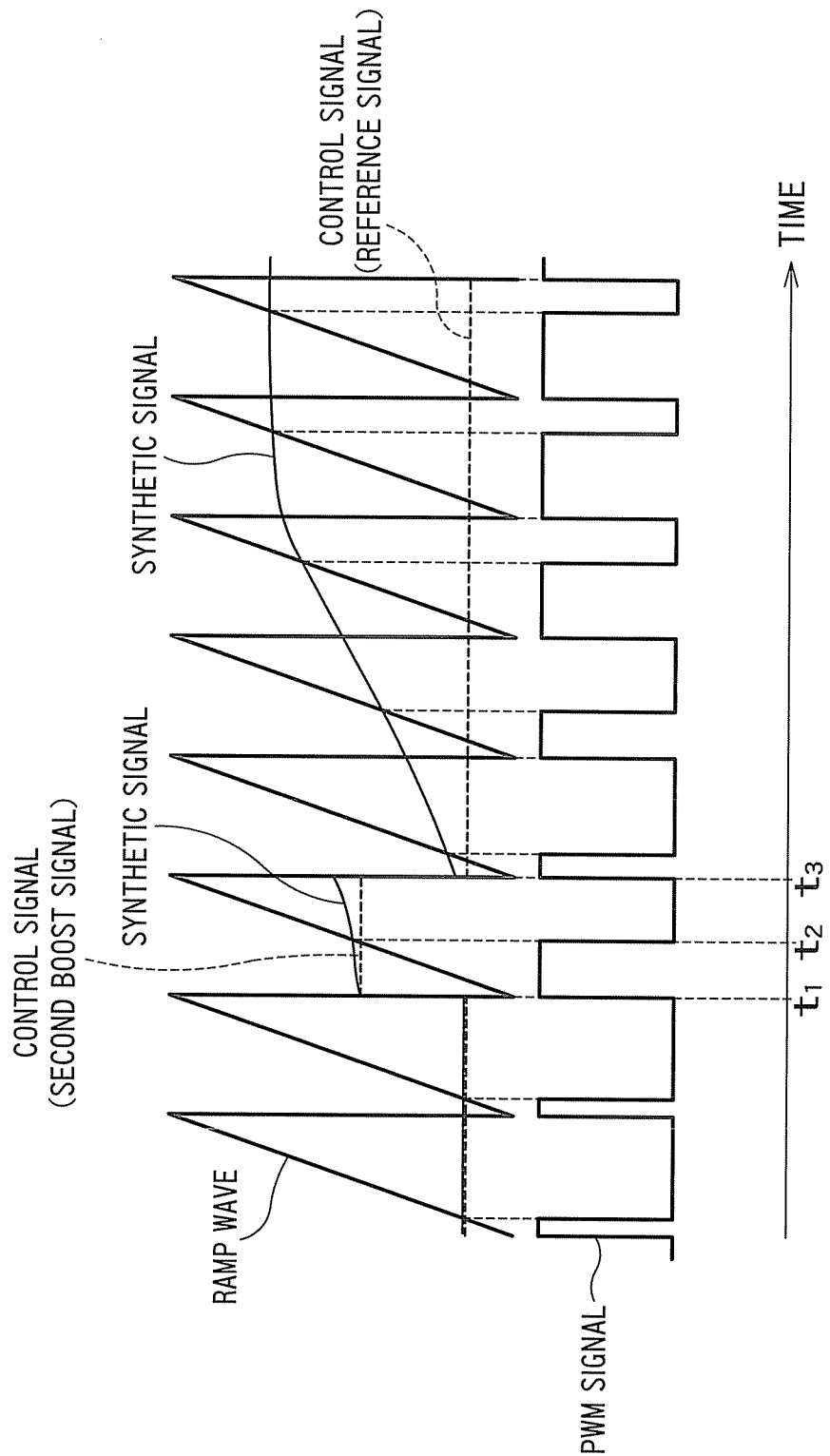
FIG. 7 is a waveform diagram showing an example of a signal waveform of the PWM generating circuit 109 shown in FIG. 6.
Figure 8:
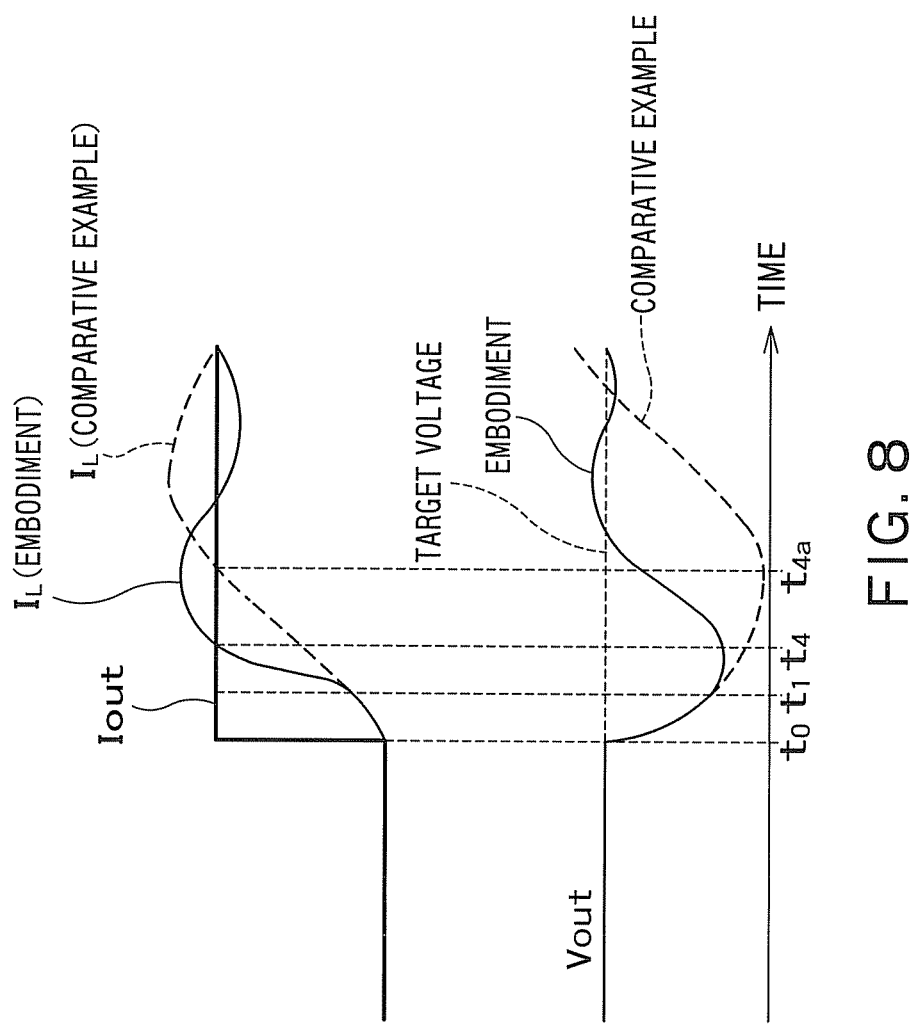
FIG. 8 is a waveform diagram showing an example of waveforms of a capacitor current Ic and an output voltage Vout obtained in the DC-DC converter 100 according to the first embodiment when the load current Tout has varied abruptly.

FIG. 7 is a waveform diagram showing an example of a signal waveform of the PWM generating circuit 109 shown in FIG. 6. FIG. 8 is a waveform diagram showing an example of waveforms of a capacitor current Ic and an output voltage Vout obtained in the DC-DC converter 100 according to the first embodiment when the load current Iout has varied abruptly. For the purpose of comparison, waveforms of a capacitor current Ic and an output voltage Vout in the DC-DC converter 100a in the comparative example already described are also shown in FIG. 8.

As shown in FIG. 7, a second boost signal is input to the PWM generating circuit 109 over a time period between time t1 and time t3, and a reference signal is input to the PWM generating circuit 109 over other time periods.

As already described, the PWM generating circuit 109 outputs a PWM signal which varies in duty ratio according to a result of comparison of a synthetic signal with a ramp wave. For example, over a time period between time t1 and time t2, the amplitude of the synthetic signal is larger than the amplitude of the ramp wave, and consequently the PWM signal assumes the "high" level. On the other hand, over a time period between the time t2 and time t3, the amplitude of the synthetic signal is smaller than the amplitude of the ramp wave, and consequently the PWM signal assumes the "low" level.

Over a time period between the time t2 and the time t3 (one period of the PWM signal), the synthetic signal contains the second boost signal and becomes larger in amplitude than the amplified error signal. As a result, the time period between the time t1 and the time t2 over which the PWM signal assumes the "high level" becomes longer the time period between the time t1 and the time t2a in the comparative example shown in FIG. 3. If the control signal is the reference signal, the same operation as that in the comparative example already described is conducted.

In the same way as the comparative example, when the PWM signal assumes the "high" level, the changeover control circuit 10 exercises control so as to turn on the first switch element 2 and turn off the second switch element 3. On the other hand, when the PWM signal assumes the "low" level, the changeover control circuit 10 exercises control so as to turn off the first switch element 2 and turn on the second switch element 3.

If the second boost signal is input in the present embodiment, therefore, the PWM generating circuit 109 outputs a PWM signal having a duty ratio D controlled so as to increase the ratio of the on-state of the first switch element 2 as compared with the comparative example.

If the load current Iout abruptly increases at time t0, then the voltage across the capacitor 5 (the output voltage Vout) abruptly falls as shown in FIG. 8. Thereupon, the DC-DC converter 100 in the first embodiment increases the inductor current IL flowing through the inductor 4 more steeply as compared with the comparative example, and raises the output voltage Vout to the target voltage faster than the comparative example.

In other words, time t4 when the inductor current IL becomes equal to the load current Iout becomes earlier than the time t4a in the comparative example. In the present first embodiment, therefore, a drop of the output voltage Vout becomes smaller as compared with the comparative example.

As already described, the differential detecting circuit 101 outputs the first boost signal or the second boost signal, for example, only over one period of the comparison signal (ramp wave), and then outputs the reference signal. As a result, the DC-DC converter 100 can change over to an operation mode temporarily changed in duty ratio of the PWM signal according to an abrupt change of the load current Tout. Therefore, a variation of the output voltage Vout caused by a variation of the load current Tout can be further reduced.

As already described, the differential detecting circuit 101 may output the first boost signal or the second boost signal over one period of the comparison signal (ramp wave), and then attenuate the amplitude. As a result, it is also possible to cope with the case where the output voltage Vout cannot be compensated during one cycle (one period of the PWM signal).

As already described, for example, the differential detecting circuit 101 outputs the first boost signal or the second boost signal having amplitude which becomes large if the absolute value of the inclination becomes large. In addition, for example, the PWM generating circuit 109 controls the duty ratio so as to raise the ratio of the on-state of the second switch element 3 if the amplitude of the first boost signal becomes large, and controls the duty ratio so as to raise the ratio of the on-state of the first switch element 2 if the amplitude of the second boost signal becomes large.

As a result, it is possible to control the duty ratio of the PWM signal more suitably according to the change magnitude of the load current Iout (the output voltage Vout) and compensate the inductor current more suitably. Therefore, the variation of the output voltage Vout caused by a variation of the load current Tout can be further reduced.

As for the basic control band, the DC-DC converter 100 according to the present first embodiment maintains a band of voltage mode control. When an abrupt load variation has occurred, the DC-DC converter 100 according to the present first embodiment improves the gain temporarily. As a result, the variation of the output voltage caused by an abrupt variation of the load current is suppressed.

When a difference between the current IL of the inductor 4 and the load current Tout is large, the output voltage abruptly varies. Since a surplus/deficient current flows into/from the capacitor 5 at this time, a variation of the output voltage Vout is generated.

The inclination of the temporal change of the output voltage Vout depends upon the magnitude of the current flowing into/from the capacitor 5. In a region where the inclination of the temporal change of the output voltage Vout is sufficiently faster than the loop band of the DC-DC converter 100, this current quantity approximates the change quantity of the load current Iout.

Therefore, the deficient current quantity can be estimated by sensing the inclination of the output voltage. It is possible to suppress the change of the output voltage due to an abrupt change of the load current by compensating the deficient current quantity.

An example of a condition for suppressing the variation of the output voltage Vout when the load current Iout of the DC-DC converter 100 has varied will now be studied.

For example, denoting a current flowing through the inductor by IL and the load current by Iout, a current IC flowing through the capacitor 5 is represented by Expression (1).

$$IC = Iout - IL \quad (1)$$

If the current IC is generated, then the inclination $\Delta V$ of the temporal change of the voltage across the capacitor 5 (the output voltage Vout) is represented by Expression (2). In Expression (2), C represents capacitance of the capacitor 5.

$$\Delta V = IC/C \quad (2)$$

If the inclination $\Delta V$ of the temporal change of the output voltage Vout is detected by changing the load current Iout, then a change quantity IL0 of the inductor current required to stabilize the output voltage V is represented by Expression (3).

$$IL0 = \Delta V \times C \quad (3)$$

An ideal condition with on-resistances of the first and second elements 2 and 3, the loss caused by turning on/off, and the loss caused by serial resistance of the inductor 4 not considered will now be considered. In the case where the output voltage Vout is in the stable state under this condition, paying attention to the current flowing through the inductor 4 brings about Expression (4). In Expression (4), fsw denotes a switching frequency (frequency of the PWM signal) and L denotes inductance of the inductor 4.

$$(Vin - Vout)/L \times (1/fsw) \times D = Vout/L \times (1/fsw) \times (1 - D) \quad (4)$$

From Expression (4), the duty ratio D is represented by Expression (5).

$$D = Vout/Vin \quad (5)$$

In other words, the output voltage Vout is brought into the stable state when the duty ratio D is equal to the output voltage Vout/the input voltage Vin as represented by Expression (5).

From this condition, a change quantity $\Delta IL$ of the inductor current IL in the case where the duty ratio is changed by a change quantity $\Delta D$ during one cycle (one period of the PWM signal) is represented by Expression (6).

$$\begin{aligned}
\Delta IL &= (Vin - Vout)/L \times (1/fsw) \times (D + \Delta D) - \\
&\quad Vout/L \times (1/fsw) \times (1 - D - \Delta D) \\
&= \{(Vin - Vout) \times (D + \Delta D) - Vout(1 - D - \Delta D)\}/(L \times fsw) \\
&= \{Vin \times D + \Delta D) - Vout\}/(L \times fsw) \\
&= Vin \times \Delta D/(L \times fsw)
\end{aligned} \quad (6)$$

When the change quantity $\Delta IL$ becomes a value close to a change quantity IL0, the switching regulator responds to a change of the load current Tout in a moment (in one period of the PWM signal) and the variation of the output voltage Vout can be suppressed. From Expressions (3) and (6), therefore, a change quantity LID of the duty ratio which makes the change quantity ΔIL equal to the change quantity IL0 is represented by Expression (7).

$$\Delta D = \Delta V \times C \times L \times fsw / Vin \quad (7)$$

There is a case where D+ΔD<1 and compensation cannot be conducted during one cycle (one period of the PWM signal). In that case, it is necessary to exercise control across a plurality of cycles (a plurality of periods of the PWM signal).

As heretofore described, the PWM generating circuit 109 sets the condition such as the change quantity ΔD of the duty ratio according to the control signal output by the differential detecting circuit 101. As a result, the variation of the output voltage Vout can be suppressed.

According to the DC-DC converter in the present embodiment, the variation of the output voltage caused by a variation of the load current can be reduced as heretofore described.

Second Embodiment

In the first embodiment, an example of the analog controlled DC-DC converter according to the present invention has been described.

However, the spirit of the present invention can also be applied to a digital controlled DC-DC converter according to the present invention in the same way.

In the second embodiment, an example of the digital controlled DC-DC converter according to the present invention will be described.

Figure 9:
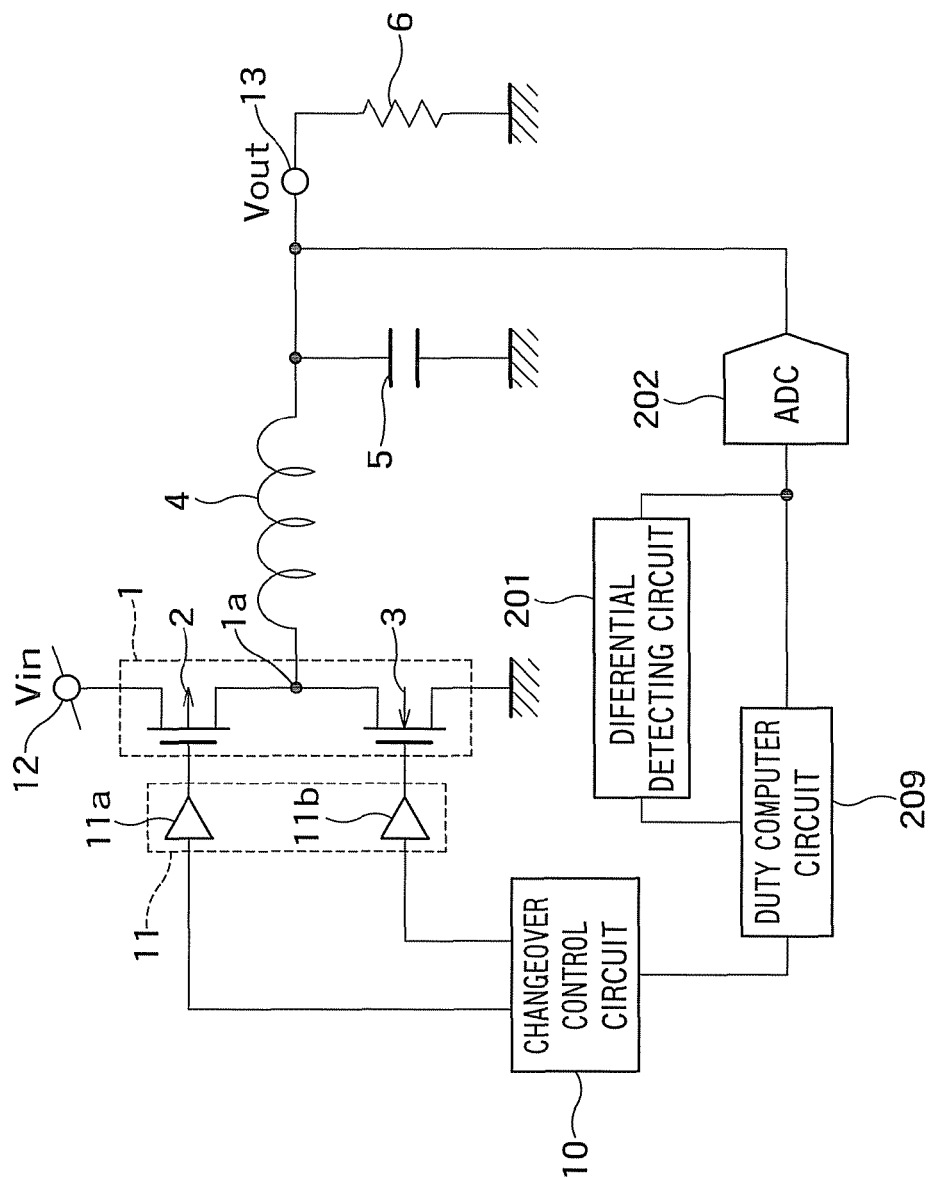
FIG. 9 is a diagram showing an example of a configuration of a DC-DC converter 200 according to the second embodiment which is one aspect of the present invention.

FIG. 9 is a diagram showing an example of a configuration of a DC-DC converter 200 according to the second embodiment which is one aspect of the present invention. In FIG. 9, the same character as a character shown in FIG. 5 denotes a component which is like that in the first embodiment.

As shown in FIG. 9, a DC-DC converter 200 includes a switch circuit 1, an inductor 4, a capacitor 5, an analog-to-digital converter (ADC) 202, a differential detecting circuit 201, a duty computer circuit 209, a changeover control circuit 10, a gate driver circuit 11, and an output terminal 13.

In this way, the DC-DC converter 200 according to the second embodiment includes the analog-to-digital converter 202 and the duty computer circuit 209 instead of the error amplifier circuit and the PWM generating circuit in the first embodiment. The duty computer circuit 209 is, for example, a PID (Proportional Integrated Differential) compensator.

In the DC-DC converter 200, the voltage divider circuit is omitted. However, the voltage divider circuit may be provided in the same way as the first embodiment. In this case, a first voltage output by the voltage divider circuit (a voltage obtained by conducting voltage division on the output voltage Vout) is input to the analog-to-digital converter 202.

The analog-to-digital converter 202 outputs a first signal obtained by conducting analog-to-digital conversion on the first voltage based on the output voltage Vout at the output terminal 13. In other words, information based on the output voltage Vout is contained in the first signal which is a digital signal. In the present second embodiment, the first voltage is the output voltage Vout. Hereafter, therefore, the DC-DC converter 200 will be described supposing that the first voltage is the output voltage Vout.

The differential detecting circuit 201 is adapted to sense the inclination of the temporal change of the output voltage Vout by differentiating the output voltage Vout based on the first signal, and output the control signal according to a result of the sensing. For example, the differential detecting circuit 201 calculates the temporal change of the output voltage by using the clock. The differential detecting circuit 201 includes, for example, a high pass filter to detect the inclination.

In other words, if the inclination exceeds a predetermined positive first threshold, then the differential detecting circuit 201 outputs a first boost signal as the control signal. If the inclination becomes less than a predetermined negative second threshold, then the differential detecting circuit 201 outputs a second boost signal as the control signal. In other cases, the differential detecting circuit 201 outputs the reference signal as the control signal.

For example, the differential detecting circuit 201 may detect the inclination based on a time period required for the output voltage Vout to change by a predetermined potential difference. The differential detecting circuit 201 may detect the inclination based on a potential difference by which the output voltage Vout has changed during a predetermined time period.

In this way, the differential detecting circuit 201 monitors the output voltage Vout (i.e., the voltage across the capacitor 5), and detects the inclination of the temporal change of the output voltage Vout. The differential detecting circuit 201 outputs the control signal based on a relation between the inclination of the temporal change of the output voltage Vout and a predetermined threshold.

The differential detecting circuit 201 outputs the first boost signal or the second booth signal over, for example, only one period of the comparison signal, and then outputs a reference signal. The differential detecting circuit 201 may output the first boost signal or the second boost signal over one period of the comparison signal and then attenuate the amplitude.

The duty computer circuit 209 is adapted to generate the amplified error signal which is a digital signal obtained by amplifying a potential difference between the output voltage Vout and the reference voltage based on, for example, the first signal and the reference voltage. And the duty computer circuit 209 compares a synthetic signal obtained by adding (computing) the amplified error signal and the control signal with a periodically changing comparison signal, and outputs a PWM signal having a duty ratio controlled according to a result of the comparison.

If the synthetic signal contains the first boost signal, the duty computer circuit 209 controls the duty ratio so as to increase the ratio of the on-state of the second switch element 3. On the other hand, if the synthetic signal contains the second boost signal, the duty computer circuit 209 controls the duty ratio so as to increase the ratio of the on-state of the first switch element 2.

Operation of the DC-DC converter 200 having the configuration described heretofore is the same as that of the first embodiment except the output voltage Vout (the first voltage) is converted to a digital signal and subject to digital processing.

In other words, the DC-DC converter 200 maintains a band of voltage mode control as the basic control band. When an abrupt load variation has occurred, the DC-DC converter 200 improves the gain temporarily. As a result, the variation of the output voltage caused by an abrupt variation of the load current is suppressed.

A condition for suppressing the variation of the output voltage Vout when the load current Iout of the DC-DC converter 200 has changed is the same as that in the first embodiment.

According to the DC-DC converter in the present embodiment, the variation of the output voltage caused by a variation of the load current can be reduced in the same way as the first embodiment, as heretofore described.

What is claimed is:

1. A circuit adapted to a DC-DC converter supplying a target voltage to an external load connected to an output terminal, the DC-DC converter having a first switch element connected at a first end thereof to a power supply; a second switch element connected between a second end of the first switch element and ground; an inductor connected at a first end thereof to a node between the first switch element and the second switch element and connected at a second end thereof to an output terminal; and a capacitor connected between the output terminal and the ground, the circuit comprising:
   an error amplifier that amplifies a potential difference between a first voltage based on an output voltage at the output terminal and a reference voltage, and outputs a resultant error amplified signal;
   a differential detecting circuit that senses an inclination of a temporal change of the output voltage by differentiating the first voltage, outputs a control signal according to a result of the sensing, outputs a first boost signal as the control signal if the inclination exceeds a predetermined positive first threshold, outputs a second boost signal as the control signal if the inclination is less than a predetermined negative second threshold, and outputs a reference signal as the control signal if the inclination is between the predetermined positive first threshold and the predetermined negative second threshold; and
   a PWM generating circuit that compares a synthetic signal obtained by conducting computation on the amplified error signal and the control signal with a periodically changing comparison signal, and outputs a PWM signal having a duty ratio controlled according to a result of the comparison,
   wherein
   the first switch element and the second switch element are changed over in an on/off state in a complementary manner according to the PWM signal,
   if the first boost signal is contained in the synthetic signal, the PWM generating circuit controls the duty ratio in order to increase a ratio of the on-state of the second switch element, and
   if the second boost signal is contained in the synthetic signal, the PWM generating circuit controls the duty ratio in order to increase a ratio of the on-state of the first switch element.

2. The circuit according to claim 1, wherein
   the differential detecting circuit detects the inclination based on a time period required for the first voltage to change by a predetermined potential difference.

3. The circuit according to claim 1, wherein
   the differential detecting circuit detects the inclination based on a potential difference by which the first voltage has changed during a predetermined time period.

4. The circuit according to claim 1, wherein
   the differential detecting circuit outputs the first boost signal or the second boost signal having amplitude which becomes large if an absolute value of the inclination becomes large,
   if amplitude of the first boost signal becomes large, then the PWM generating circuit controls the duty ratio in order to increase the ratio of the on-state of the second switch element, and
   if amplitude of the second boost signal becomes large, then the PWM generating circuit controls the duty ratio in order to increase the ratio of the on-state of the first switch element.

5. The circuit according to claim 1, wherein the differential detecting circuit outputs the first boost signal or the second boost signal over one period of the comparison signal, and then outputs the reference signal.

6. The circuit according to claim 1, wherein the differential detecting circuit outputs the first boost signal or the second boost signal over one period of the comparison signal, and then attenuates amplitude thereof.

7. The circuit according to claim 1, wherein the first voltage is the output voltage.

8. The circuit according to claim 1, wherein the comparison signal is a ramp wave.

9. The circuit according to claim 1, wherein the first switch element and the second switch element are MOS transistors.

10. A circuit adapted to a DC-DC converter supplying a target voltage to an external load connected to an output terminal, the DC-DC converter having a first switch element connected at a first end thereof to a power supply; a second switch element connected between a second end of the first switch element and ground; an inductor connected at a first end thereof to a node between the first switch element and the second switch element and connected at a second end thereof to an output terminal; and a capacitor connected between the output terminal and the ground, the circuit comprising:
    a voltage divider circuit that outputs a first voltage obtained by conducting voltage division on the output voltage;
    an error amplifier that amplifies a potential difference between the first voltage and a reference voltage, and outputs a resultant error amplified signal;
    a differential detecting circuit that senses an inclination of a temporal change of the output voltage by differentiating the first voltage, outputs a control signal according to a result of the sensing, outputs a first boost signal as the control signal if the inclination exceeds a predetermined positive first threshold, outputs a second boost signal as the control signal if the inclination is less than a predetermined negative second threshold, and outputs a reference signal as the control signal if the inclination is between the predetermined positive first threshold and the predetermined negative second threshold; and
    a PWM generating circuit that compares a synthetic signal obtained by conducting computation on the amplified error signal and the control signal with a periodically changing comparison signal, and outputs a PWM signal having a duty ratio controlled according to a result of the comparison,
    wherein
    the first switch element and the second switch element are changed over in an on/off state in a complementary manner according to the PWM signal,
    if the first boost signal is contained in the synthetic signal, the PWM generating circuit controls the duty ratio in order to increase a ratio of the on-state of the second switch element, and
    if the second boost signal is contained in the synthetic signal, the PWM generating circuit controls the duty ratio in order to increase a ratio of the on-state of the first switch element.

11. The circuit according to claim 10, wherein
    the differential detecting circuit detects the inclination based on a time period required for the first voltage to change by a predetermined potential difference.

12. The circuit according to claim 10, wherein the differential detecting circuit detects the inclination based on a potential difference by which the first voltage has changed during a predetermined time period.

13. The circuit according to claim 10, wherein the differential detecting circuit outputs the first boost signal or the second boost signal having amplitude which becomes large if an absolute value of the inclination becomes large, if amplitude of the first boost signal becomes large, then the PWM generating circuit controls the duty ratio in order to increase the ratio of the on-state of the second switch element, and if amplitude of the second boost signal becomes large, then the PWM generating circuit controls the duty ratio in order to increase the ratio of the on-state of the first switch element.

14. A circuit adapted to a DC-DC converter supplying a target voltage to an external load connected to an output terminal, the DC-DC converter having a first switch element connected at a first end thereof to a power supply; a second switch element connected between a second end of the first switch element and ground; an inductor connected at a first end thereof to a node between the first switch element and the second switch element and connected at a second end thereof to an output terminal; and a capacitor connected between the output terminal and the ground, the circuit comprising:

an analog-to-digital converter that outputs a first signal obtained by conducting analog-to-digital conversion on the first voltage based on the output voltage at the output terminal;

a differential detecting circuit that senses an inclination of a temporal change of the output voltage by differentiating the first voltage based on the first signal, outputs a control signal according to a result of the sensing, outputs a first boost signal as the control signal if the inclination exceeds a predetermined positive first threshold, outputs a second boost signal as the control signal if the inclination is less than a predetermined negative second threshold, and outputs a reference signal as the control signal if the inclination is between the predetermined positive first threshold and the predetermined negative second threshold; and a duty computer circuit that compares a synthetic signal obtained by conducting computation on an amplified error signal which is a digital signal obtained by amplifying a potential difference between the first voltage and a reference voltage with a periodically changing comparison signal, and outputs a PWM signal having a duty ratio controlled according to a result of the comparison, wherein the first switch element and the second switch element are changed over in an on/off state in a complementary manner according to the PWM signal, if the first boost signal is contained in the synthetic signal, the duty computer circuit controls the duty ratio in order to increase a ratio of the on-state of the second switch element, and if the second boost signal is contained in the synthetic signal, the duty computer circuit controls the duty ratio in order to increase a ratio of the on-state of the first switch element.

15. The circuit according to claim 14, wherein the differential detecting circuit detects the inclination based on a time period required for the first voltage to change by a predetermined potential difference.

16. The circuit according to claim 14, wherein the differential detecting circuit detects the inclination based on a potential difference by which the first voltage has changed during a predetermined time period.

17. The circuit according to claim 14, wherein the differential detecting circuit outputs the first boost signal or the second boost signal having amplitude which becomes large if an absolute value of the inclination becomes large, if amplitude of the first boost signal becomes large, then the PWM generating circuit controls the duty ratio in order to increase the ratio of the on-state of the second switch element, and if amplitude of the second boost signal becomes large, then the PWM generating circuit controls the duty ratio in order to increase the ratio of the on-state of the first switch element.

18. The circuit converter according to claim 14, wherein the differential detecting circuit outputs the first boost signal or the second boost signal over one period of the comparison signal, and then outputs the reference signal.

19. The circuit according to claim 14, wherein the differential detecting circuit outputs the first boost signal or the second boost signal over one period of the comparison signal, and then attenuates amplitude thereof.

20. The circuit according to claim 14, wherein the first switch element and the second switch element are MOS transistors.

* * * * *